US012800597B2

(12) United States Patent
Miyada et al.

(10) Patent No.: US 12,800,597 B2
(45) Date of Patent: Nov. 17, 2026

(54) AUTOMATIC ANALYZER

(71) Applicants: Hitachi High-Tech Corporation, Tokyo (JP); Roche Diagnostics Operations, Inc., Indianapolis, IN (US)

(72) Inventors: Yuki Miyada, Tokyo (JP); Elisabeth Foester, Penzberg (DE); Maximilian Steigenberger, Penzberg (DE)

(73) Assignees: Hitachi High-Tech Corporation, Tokyo (JP); Roche Diagnostics Operations, Inc., Indianapolis, IN (US)

( * ) Notice: Subject to any disclaimer, the term of this patent is extended or adjusted under 35 U.S.C. 154(b) by 438 days.

(21) Appl. No.: 18/683,438

(22) PCT Filed: Jun. 29, 2022

(86) PCT No.: PCT/JP2022/026000

§ 371 (c)(1), (2) Date: Feb. 13, 2024

(87) PCT Pub. No.: WO2023/021857

PCT Pub. Date: Feb. 23, 2023

(65) Prior Publication Data

US 2024/0353437 A1 Oct. 24, 2024

(30) Foreign Application Priority Data

Aug. 18, 2021 (JP) ................................ 2021-133185

(51) Int. Cl.

*B01L 3/00* (2006.01)
*B01D 15/08* (2006.01)
(Continued)

(52) U.S. Cl.

CPC ..... *G01N 35/00722* (2013.01); *G01N 35/025* (2013.01); *G01N 35/1002* (2013.01); *G01N 2035/0091* (2013.01)

(58) Field of Classification Search

CPC .......... G01N 35/00722; G01N 35/025; G01N 35/1002; G01N 2035/0091;
(Continued)

(56) References Cited

U.S. PATENT DOCUMENTS

2014/0170023 A1 6/2014 Saito et al.
2015/0293136 A1 10/2015 Shiba et al.
(Continued)

FOREIGN PATENT DOCUMENTS

CN 112444637 A 3/2021
JP 2014-98618 A 5/2014
(Continued)

OTHER PUBLICATIONS

International Search Report (PCT/ISA/210) issued in PCT Application No. PCT/JP2022/026000 dated Sep. 13, 2022 with English translation (4 pages).
(Continued)

*Primary Examiner* — Oyeleye Alexander Alabi
(74) *Attorney, Agent, or Firm* — Crowell & Moring LLP

(57) ABSTRACT

There is provided an automatic analyzer equipped with a disk-type container placement mechanism, which enables an operator to perform additional placement of a container during analysis operation. The automatic analyzer includes a storage unit previously stored with a sample container 103 holding a sample before measurement of the sample, a dispensing mechanism 4 that sucks the sample from the sample container, an input unit that receives a command to store an emergency sample in the storage unit, the control unit 7 that controls such that, after a first operation being performed by the dispensing mechanism at a point of time when the command is received is completed, a second operation scheduled to be performed next by the dispensing mechanism is not started, and a display unit that prompts a
(Continued)

user to store the emergency sample in the storage unit, in which the storage unit includes a first storage unit that stores an ordinary sample and a second storage unit that stores the emergency sample, and after controlling such that the second operation is not started, the control unit controls the second storage unit to move to a position where the emergency sample is inserted by a user.

10 Claims, 9 Drawing Sheets

(51) Int. Cl.

| | |
|---|---|
| ***B01F 33/302*** | (2022.01) |
| ***B01F 33/3033*** | (2022.01) |
| ***B01J 8/00*** | (2006.01) |
| ***B01J 8/02*** | (2006.01) |
| ***B01J 20/285*** | (2006.01) |
| ***B01J 20/287*** | (2006.01) |
| ***B01J 20/32*** | (2006.01) |
| ***B01L 7/00*** | (2006.01) |
| ***B01L 9/00*** | (2006.01) |
| ***B33Y 10/00*** | (2015.01) |
| ***B33Y 80/00*** | (2015.01) |
| ***B65G 47/80*** | (2006.01) |
| ***B82Y 20/00*** | (2011.01) |
| ***B82Y 30/00*** | (2011.01) |
| ***B82Y 40/00*** | (2011.01) |
| ***C08L 5/08*** | (2006.01) |
| ***C12M 1/34*** | (2006.01) |
| ***C12M 3/06*** | (2006.01) |
| ***C12N 1/14*** | (2026.01) |
| ***C12N 1/20*** | (2026.01) |
| ***C12Q 1/02*** | (2006.01) |
| ***C12Q 1/6806*** | (2018.01) |
| ***C12Q 1/6844*** | (2018.01) |
| ***C12Q 1/6848*** | (2018.01) |
| ***C12Q 1/6851*** | (2018.01) |
| ***C12Q 1/686*** | (2018.01) |
| ***G01K 1/14*** | (2021.01) |
| ***G01N 1/44*** | (2006.01) |
| ***G01N 15/10*** | (2024.01) |
| ***G01N 15/14*** | (2024.01) |
| ***G01N 15/1433*** | (2024.01) |
| ***G01N 21/01*** | (2006.01) |
| ***G01N 21/03*** | (2006.01) |
| ***G01N 21/05*** | (2006.01) |
| ***G01N 21/29*** | (2006.01) |
| ***G01N 21/33*** | (2006.01) |
| ***G01N 21/35*** | (2014.01) |
| ***G01N 21/59*** | (2006.01) |
| ***G01N 21/65*** | (2006.01) |
| ***G01N 21/75*** | (2006.01) |
| ***G01N 21/77*** | (2006.01) |
| ***G01N 27/07*** | (2006.01) |
| ***G01N 27/28*** | (2006.01) |
| ***G01N 30/02*** | (2006.01) |
| ***G01N 30/60*** | (2006.01) |
| ***G01N 30/72*** | (2006.01) |
| ***G01N 31/10*** | (2006.01) |
| ***G01N 31/12*** | (2006.01) |
| ***G01N 33/543*** | (2006.01) |
| ***G01N 33/557*** | (2006.01) |
| ***G01N 33/564*** | (2006.01) |
| ***G01N 33/574*** | (2006.01) |
| ***G01N 33/575*** | (2026.01) |
| ***G01N 33/57515*** | (2026.01) |
| ***G01N 33/58*** | (2006.01) |
| ***G01N 33/68*** | (2006.01) |
| ***G01N 33/72*** | (2006.01) |
| ***G01N 35/00*** | (2006.01) |
| ***G01N 35/02*** | (2006.01) |
| ***G01N 35/10*** | (2006.01) |
| ***H05B 45/10*** | (2020.01) |
| ***H10W 90/00*** | (2026.01) |

(58) Field of Classification Search

CPC . G01N 2035/00306; G01N 2035/0443; G01N 2035/0465; G01N 35/04; G01N 35/0095; G01N 2035/0441; G01N 2035/0446

See application file for complete search history.

(56) References Cited

U.S. PATENT DOCUMENTS

| | | | | |
|---|---|---|---|---|
| 2017/0328925 | A1* | 11/2017 | Sano | G01N 1/38 |
| 2022/0341956 | A1* | 10/2022 | Saito | G01N 35/0092 |

FOREIGN PATENT DOCUMENTS

| | | | |
|---|---|---|---|
| JP | 2015-129676 | A | 7/2015 |
| JP | 2019-27954 | A | 2/2019 |
| JP | 2020-160086 | A | 10/2020 |
| WO | WO 2013/035418 | A1 | 3/2013 |
| WO | WO 2021/070546 | A1 | 4/2021 |

OTHER PUBLICATIONS

Japanese-language Written Opinion (PCT/ISA/237) issued in PCT Application No. PCT/JP2022/026000 dated Sep. 13, 2022 with English translation (11 pages).

Japanese-language International Preliminary Report on Patentability (PCT/IPEA/409) issued in PCT Application No. PCT/JP2022/026000 dated Jun. 12, 2023, including Annexes with partial English translation (18 pages).

Extended European Search Report issued in European Application No. 22858180.7 dated Jul. 8, 2025 (11 pages).

* cited by examiner

[FIG. 1]
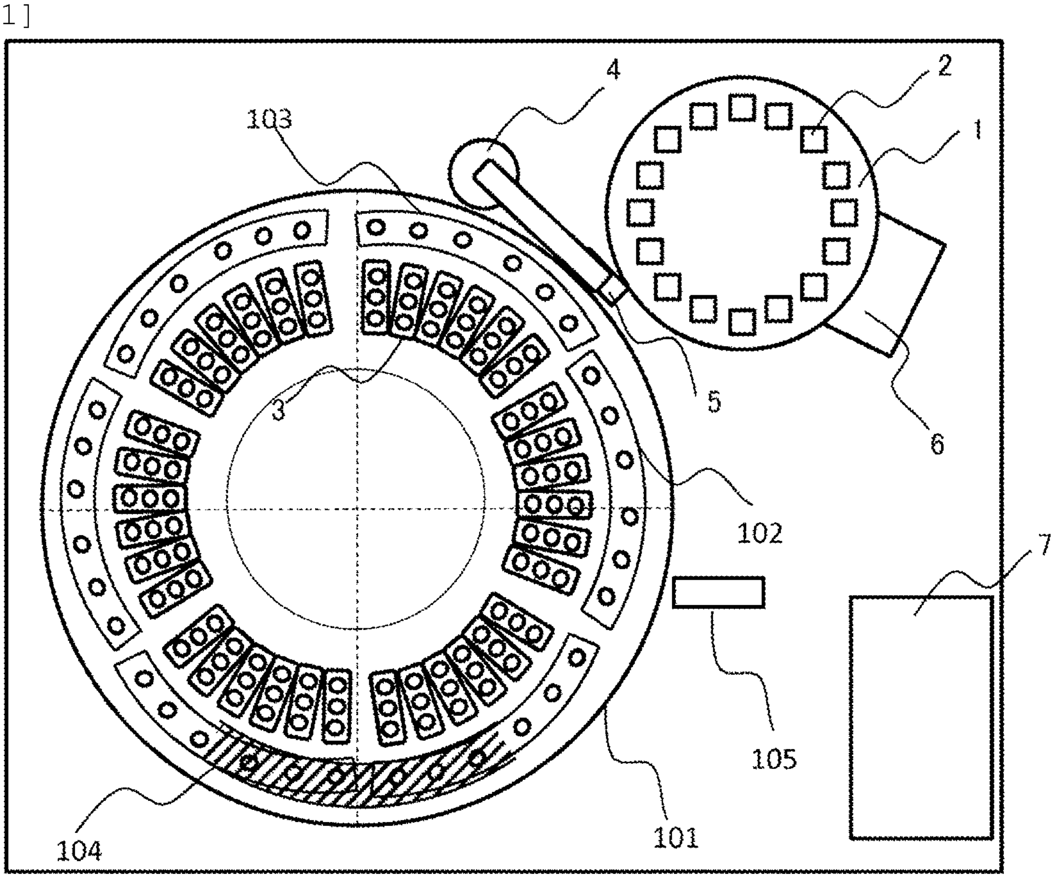

[FIG. 2A]
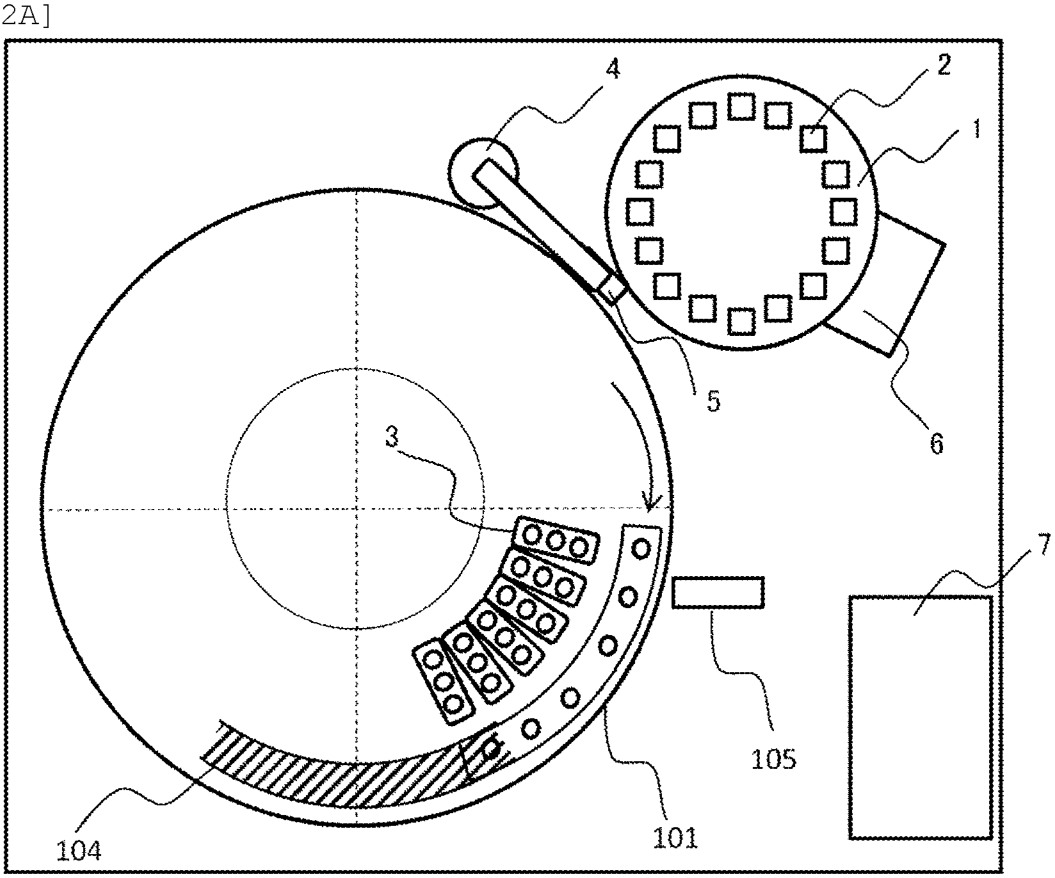

[FIG. 2B]
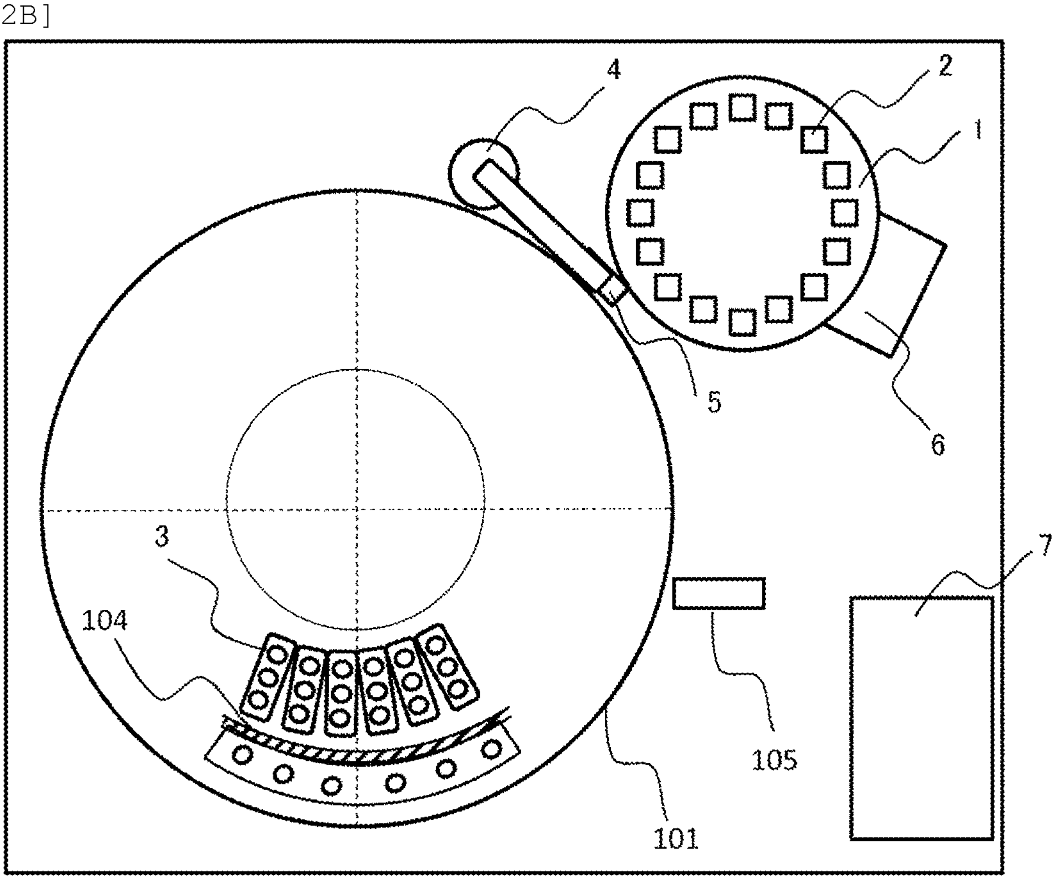

[FIG. 3]
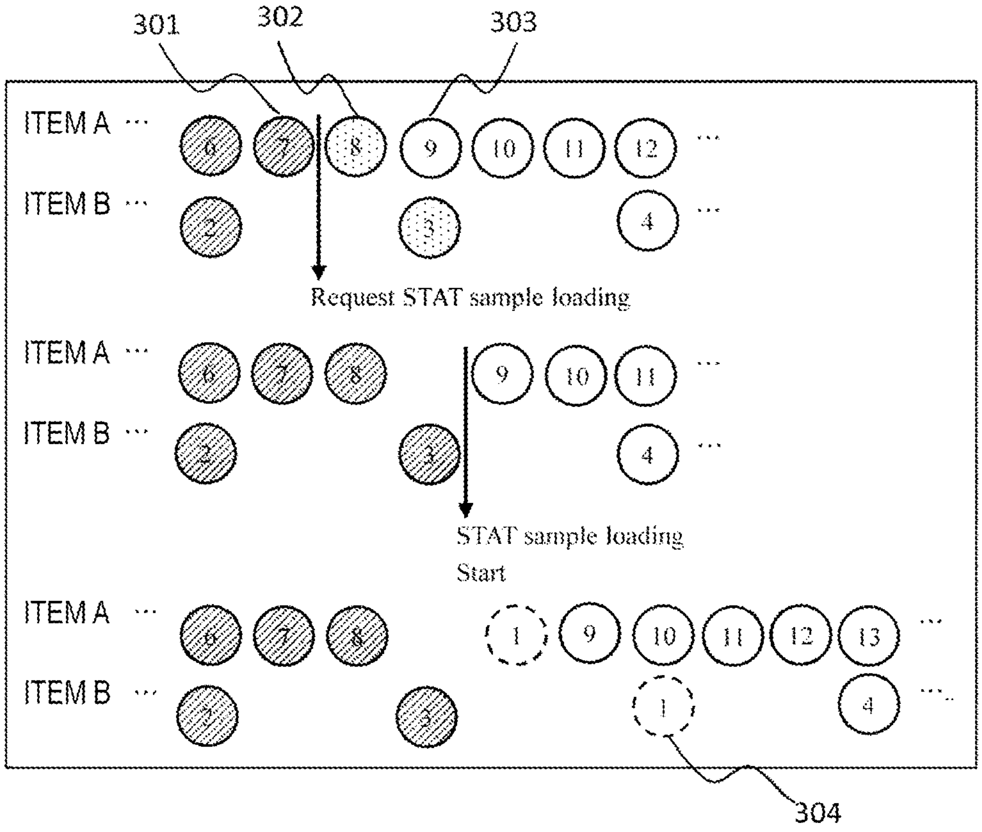

[FIG. 4]
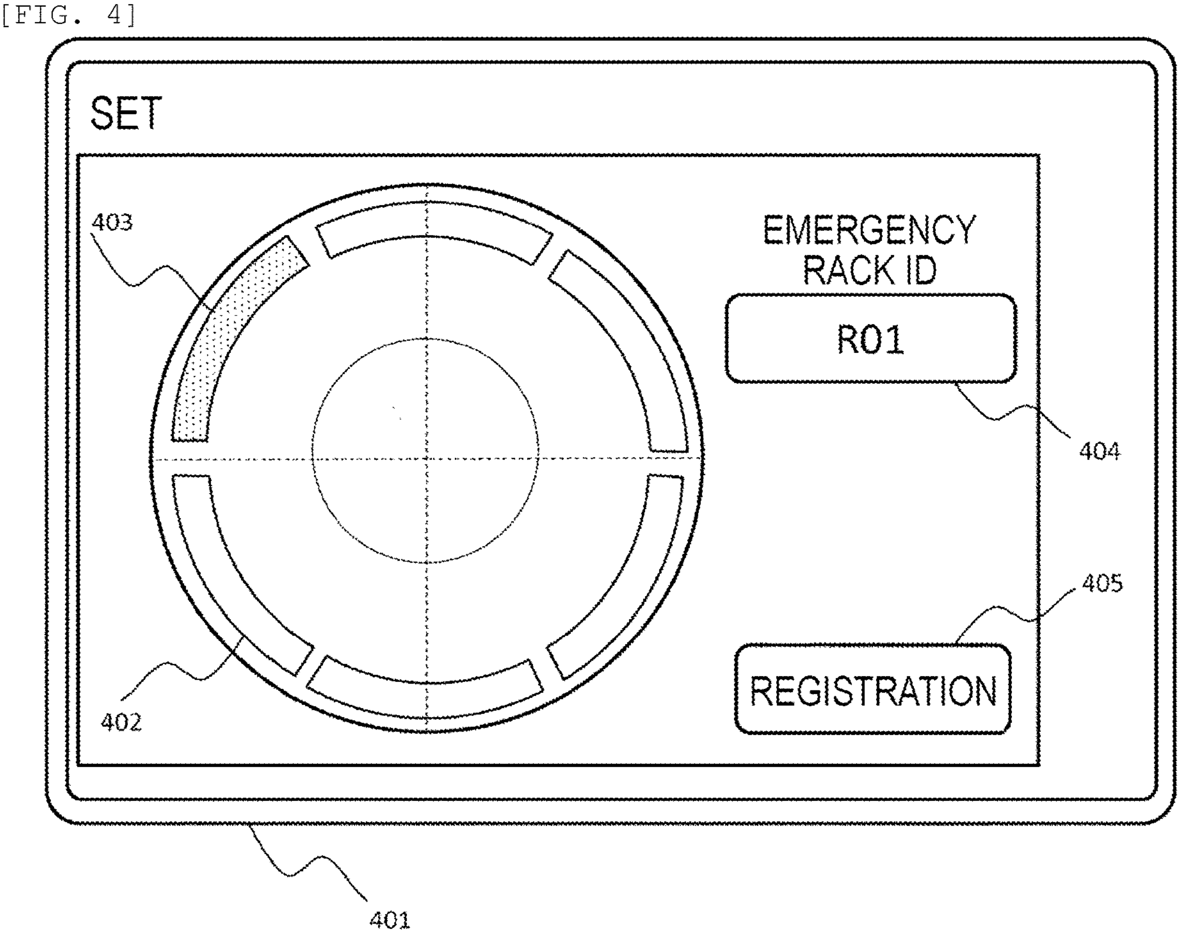

[FIG. 5]
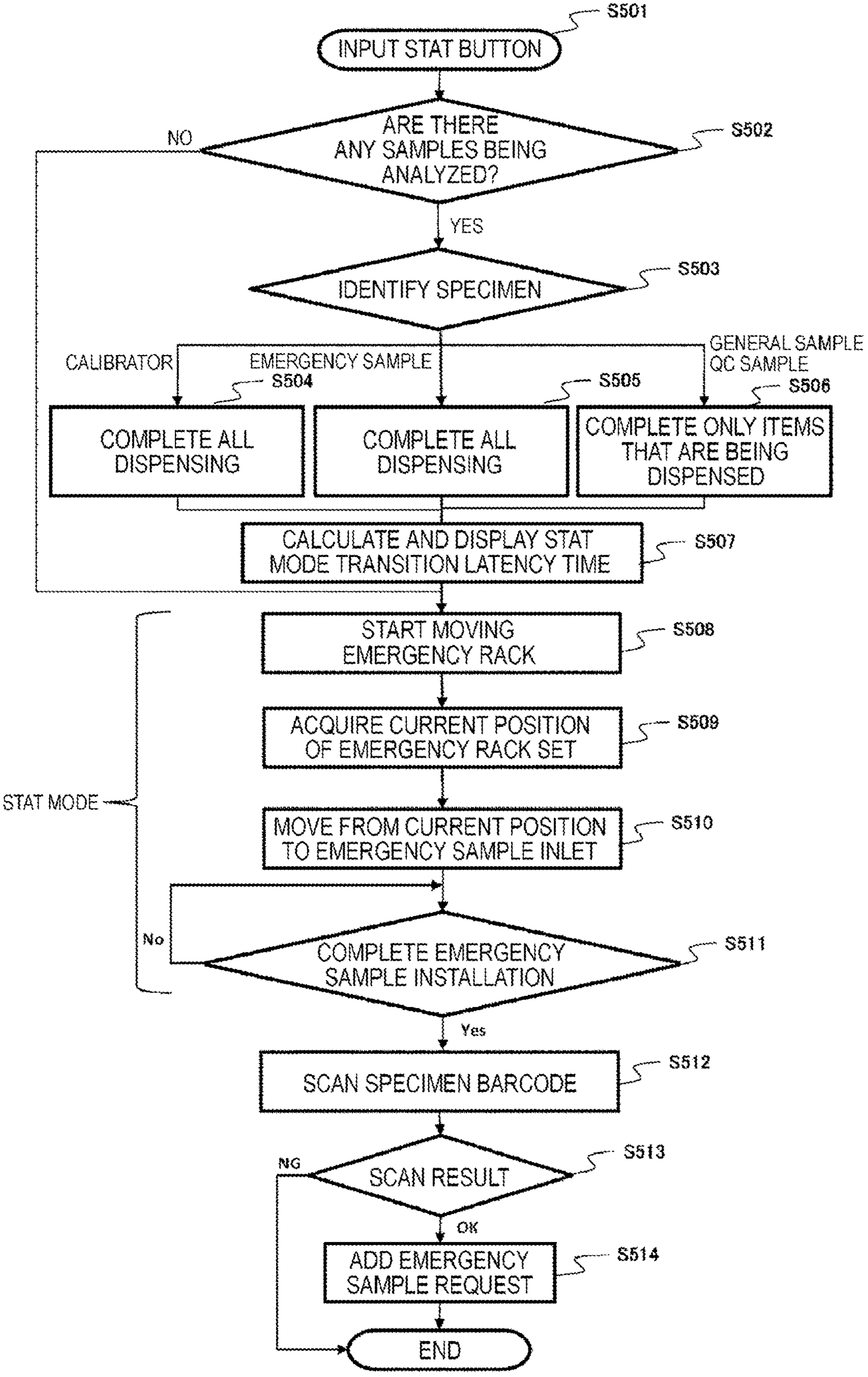

[FIG. 6]
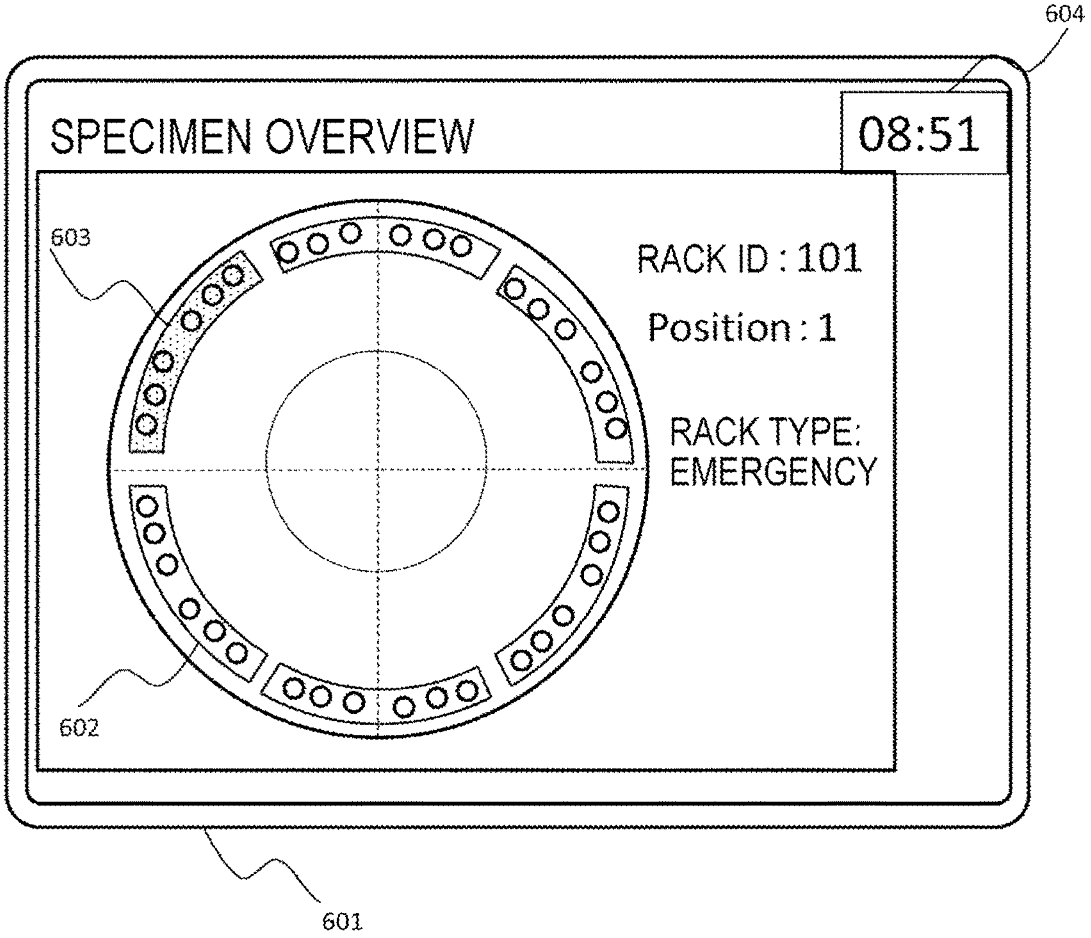

[FIG. 7A]
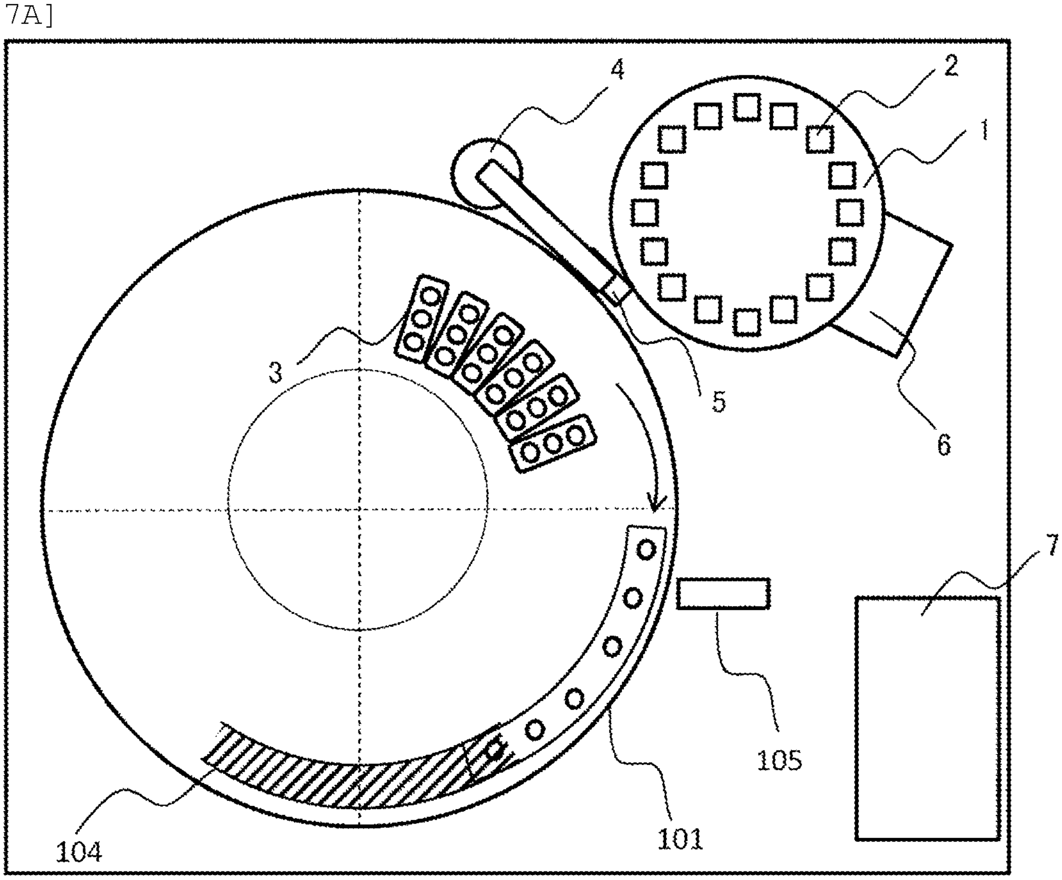

[FIG. 7B]
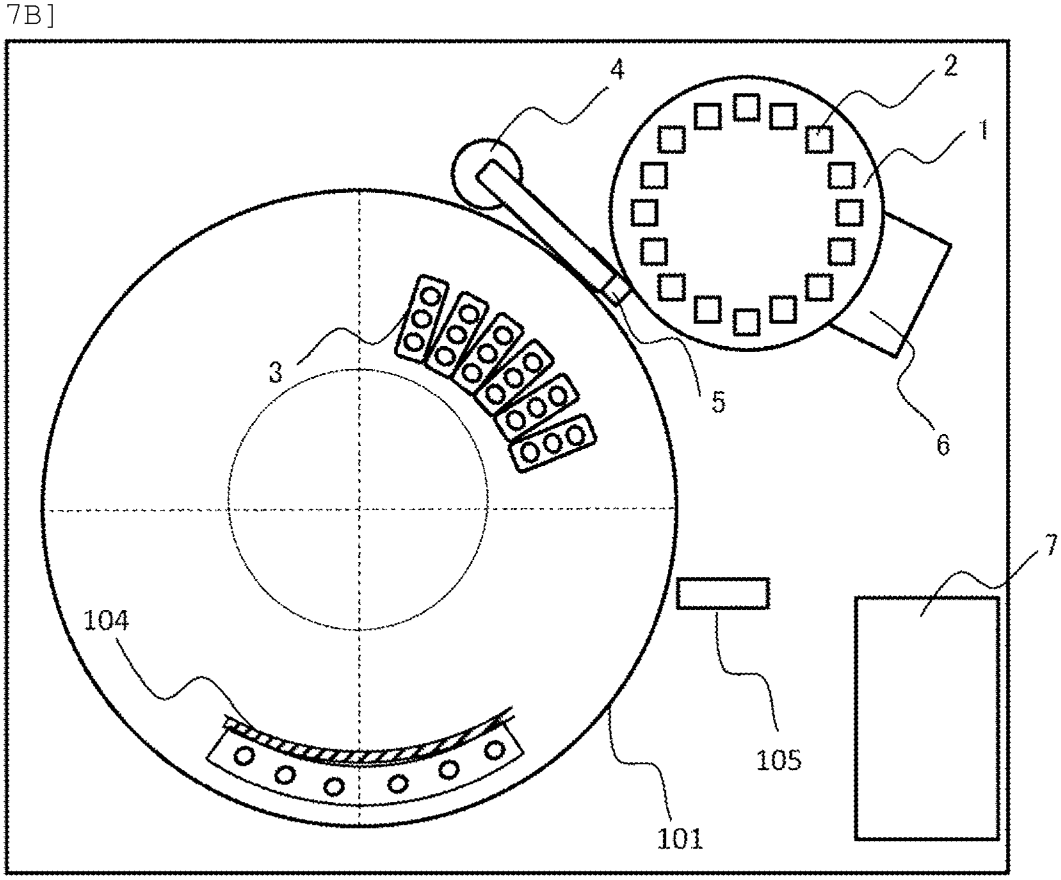

AUTOMATIC ANALYZER

TECHNICAL FIELD

The present invention relates to an automatic analyzer.

BACKGROUND ART

Automatic analyzers that perform quantitative and qualitative analyses on particular components contained in biological specimens (hereinafter referred to as "samples") such as blood or urine are indispensable for current diagnosis because their analysis results are highly reproducible and their processing speeds are fast.

There has been disclosed an automatic analyzer that allows the operator to additionally install a container during an analyzing operation and that has a dedicated inlet through which the user can put an emergency sample when the emergency sample demands queue jumping (see Patent Document 1).

PRIOR ART DOCUMENT

Patent Document

Patent Document 1: JP-2019-027954-A

SUMMARY OF THE INVENTION

Problems to be Solved by the Invention

According to Patent Document 1, the dedicated inlet for emergency samples tends to increase mechanisms that need to be installed on the automatic analyzer, possibly leading to an increased first cost and an increased analyzer unit cost.

It is therefore an object of the present invention to provide an automatic analyzer that allows the operator to additionally install a container easily during an analyzing operation.

Means for Solving the Problems

In order to solve the problems referred to above, there is provided in accordance with the present invention an automatic analyzer including a storage unit previously stored with a sample container holding a sample before measurement of the sample, a sample dispensing unit that aspirates and dispenses the sample from the sample container, an input unit that receives a command to store an emergency sample in the storage unit, a control unit that controls such that, after a first operation being performed by the sample dispensing unit at a point of time when the input unit receives the command is completed, a second operation scheduled to be performed next by the sample dispensing unit is not started, and a display unit that prompts a user to store the emergency sample in the storage unit.

Advantages of the Invention

According to the present invention, there is provided an automatic analyzer that allows the operator to additionally install a container easily during an analyzing operation.

DESCRIPTION OF THE DRAWINGS

FIG. 1 is a plan view illustrating a configuration example of an automatic analyzer.

FIG. 2A is a diagram illustrating a sample moved to an erectable portion.

FIG. 2B is a diagram illustrating a state in which a STAT sample can be erected.

FIG. 3 is a diagram illustrating an example of a timing at which the STAT sample can be erected and an order of measuring sample in that situation.

FIG. 4 is a diagram illustrating an example of a screen for setting an emergency rack.

FIG. 5 is a flowchart from when a STAT button is pressed until an emergency sample request is added.

FIG. 6 is a diagram illustrating an example of a screen for displaying an overview of sample and rack information.

FIG. 7A is a diagram illustrating that only the emergency rack is moved to the erectable portion.

FIG. 7B is a diagram illustrating a state in which the STAT sample can be erected.

MODE FOR CARRYING OUT THE INVENTION

An embodiment of the present invention will be described in detail below with reference to the drawings. In the embodiment to be described below, its constituent elements (including steps) should not be construed necessarily as the indispensable unless specifically indicated or otherwise considered obviously essential according to principles.

Embodiment 1

FIG. 1 schematically illustrates an automatic analyzer in plan. As illustrated in FIG. 1, reaction vessels 2 are disposed in a circumferential array of positions on a reaction disk configuring an incubator 1. The reaction vessels 2 are shared for all reactions. The incubator 1 is controlled so as to be rotationally driven by a drive mechanism such as an electric motor, not depicted.

Automatic analyzers include a rack-type or disk-type container placement mechanism (including a function to deliver containers). The rack-type container placement mechanism is suitable for a batch analysis on a plurality of containers, whereas the disk-type container placement mechanism lends itself to an analysis on individual containers. According to the present embodiment, the automatic analyzer incorporates a disk-type sample container placement mechanism.

A sample container placement mechanism 101 (also referred to as a "sample/reagent disk") that acts as a storage unit previously stored with sample containers holding samples accommodated therein can have a plurality of reagent bottles 3 and sample containers 103 placed thereon. As illustrated in FIG. 1, the sample container placement mechanism 101 is shaped as a disk. Each of the reagent bottles 3 includes a plurality of (three illustrated) coupled reagent containers each containing a reagent therein. In the illustrated embodiment, there are 36 reagent bottles 3 positioned on the inner periphery of the sample containers 103. Alternatively, however, the sample containers 103 may be positioned on the inner periphery of the reagent bottles 3, and the reagent bottles 3 and the sample containers 103 may be separated circumferentially, rather than radially, from each other. Furthermore, the sample container placement mechanism 101, which is illustrated as a storage unit shared by reagents and samples, may include different storage units for storing reagents and samples, respectively.

A dispensing mechanism 4 having a dispensing nozzle, which is arcuately (angularly) movable and vertically movable, is disposed between the incubator 1 and the sample container placement mechanism 101. The dispensing nozzle moves along an arcuate track about a rotational axis to dispense reagents or samples from the reagent bottles 3 or the sample containers 103 to the reaction vessels 2. On the track of the dispensing nozzle, there exist a reagent suction position and a sample suction position on the sample container placement mechanism 101, a dispensing position on the incubator 1, and a cleaning tank 5 for cleaning the dispensing nozzle.

The dispensing nozzle aspirates a sample and a reagent, and agitates and mixes the sample and the reagent by performing an aspirating and discharging action in a reaction container 2. By thus agitating samples and reagents with a pipetting action of the dispensing nozzle, there is no need for an agitating mechanism for agitating samples and reagents. The reaction vessel 2 that contains a reaction liquid prepared by mixing the sample and the reagent is managed to be kept at a predetermined temperature by the incubator 1 for accelerating its reaction for a predetermined time.

Providing the automatic analyzer according to the present embodiment is used for biochemical examination, a spectrophotometer 6 is disposed around the incubator 1. The spectrophotometer 6 includes a light source and a detector, not depicted, and measures the absorbance of a reaction liquid prepared by mixing a sample and a reagent, by applying light from the light source to the reaction liquid and spectrally dispersing and detecting the light transmitted through the reaction liquid. Note that the principles of detection of the automatic analyzer are not limited to those for biochemical examination. For example, providing the automatic analyzer as used for immunological examination, the automatic analyzer does not require the spectrophotometer 6, but includes an immunological analyzing unit. For example, the automatic analyzer operates on the principles of electrochemical light emission or chemical light emission, and measures the amount of light resulting from a light emission reaction of a marker with a photomultiplier tube as a detector. Furthermore, providing the automatic analyzer is used as a hybrid type for both biochemical examination and immunological examination, the automatic analyzer includes both the spectrophotometer 6 and the immunological analyzing unit.

The mechanisms of the automatic analyzer are electrically connected to a control unit 7. The control unit 7 controls operations of the mechanisms such as rotation driving of the incubator 1, rotation operations of the inner parts of the sample container placement mechanism 101, a driving and dispensing operation of the dispensing mechanism 4, and cleaning of the dispensing nozzle in the cleaning tank 5. The control unit 7 has an ordinary central processing unit (CPU), a display unit as an input/output unit, and a STAT button, not depicted. The display unit has a display screen functioning as an input unit. In FIG. 1, the electric connections between the mechanisms of the automatic analyzer and the control unit 7 are omitted from illustration for the sake of brevity.

The sample containers 103 are stored in sample racks 102. As illustrated in FIG. 1, the sample racks 102 are positioned on an outer circumferential portion of the disk-shaped sample container placement mechanism 101, and the reagent bottles 3 are positioned on an inner peripheral portion of the disk-shaped sample container placement mechanism 101. In other words, the storage unit is disk-shaped with samples disposed on an outer circumferential portion of the storage unit and reagents disposed on an inner peripheral portion of the storage unit. The control unit 7 controls the storage unit so as to move the outer peripheral portion. Only some of the sample containers 103 that are disposed on a circumference are illustrated for the sake of brevity.

The sample containers 103 are erected on the sample racks 102 by the user. The sample container placement mechanism 101 can be rotated about its central axis to move any desired sample container 103 having been erected to a required position. Once the automatic analyzer starts an analysis, since the sample container placement mechanism 101 is rotated each time a sample is required to be dispensed, the user is usually unable to erect a new sample container on the sample container placement mechanism 101 during the analyzing operation.

In order to make it possible for the user to additionally erect a new sample container on the sample container placement mechanism 101 during an analyzing operation, the automatic analyzer according to the present embodiment has a function to set any one of the sample racks 102 stored in advance as an additional rack (hereinafter referred to as "emergency rack").

Inasmuch as the user should avoid additionally erecting a sample container 103 during an analyzing operation for safety reasons, the automatic analyzer has a function to transition to a state in which a sample container 103 is erectable on the emergency rack (hereinafter referred to as "STAT mode").

On an automatic analyzer including a conventional disk-type container placement mechanism, it is the usual practice, prior to an analysis, for the user to perform work of placing sample containers in container placement portions of a sample disk while the operation of the automatic analyzer is stopped. The user then sets information about samples, analytic items, etc. into the automatic analyzer and inputs an instruction to start an analysis. The automatic analyzer now starts an analyzing operation regarding preset sample containers installed on the sample disk. Once the automatic analyzer has started the analyzing operation, the automatic analyzer is not basically stopped until it has completed the analyzing operation. During the analyzing operation, the annular portion of the sample disk moves intermittently to make intermittent rotary movement. Stated otherwise, each of the container placement portions repeats unit rotary movement and rest.

During the analyzing operation, there may be a case in which the user wants to additionally install a sample container on the sample disk. For example, an emergency sample to be analyzed in emergency may occur as an additional sample. In this case, according to a recommended procedure, first, the user is required to install an additional sample container on the sample disk after having waited until the analyzing operation on existing samples has been completed. Alternatively, second, the automatic analyzer is required to stop whole or part of the operations before the user installs the additional sample on the sample disk. Part of the operations means operations of the sample disk and the sample dispensing mechanism and the like in its periphery. The reason for stopping the automatic analyzer is that if the user performs container placement work while the mechanisms are in operation, the safety of the user and the samples could not be ensured. For example, if the user's finger may contact the tip end of the probe, the user may run the risk of becoming injured or infected, and the contamination of the tip end of the probe may tend to affect the analysis. In addition, the sample container may be liable to be damaged when brought into contact with the moving mechanisms.

While the automatic analyzer is in an operation stopping state, the user installs the additional sample container in an empty container placement portion on the sample disk. Thereafter, the user operates the automatic analyzer again to perform an analyzing operation on the additional sample container.

The embodiment regarding an automatic analyzer including a disk-type container placement mechanism will be described below, in which the work of additionally installing a container during an analyzing operation is performed by a user without taking much trouble while better convenience and easiness of the work being realized, and further, the embodiment is capable of ensuring the safety of the user and the samples, reducing the number of mechanisms required of the automatic analyzer in its entirety, contributing to a cost reduction, and increasing customer satisfaction.

FIG. 2A is a view illustrating the manner in which the automatic analyzer moves an emergency rack to an emergency sample lid 104 where samples are erectable upon transition to the STAT mode. FIG. 2B is a view illustrating the manner in which a new sample container to be additionally installed can be installed by opening the emergency sample lid 104. Only the emergency rack and the reagent bottles disposed on an inner peripheral portion of the emergency rack are illustrated herein for a better understanding of the rotation operation of the sample disk.

In order to realize a transition to the STAT mode, the automatic analyzer includes an input unit (hereinafter referred to as "STAT button") that receives an additional sample erecting request command from the user. After having received an input from the user via the STAT button, the automatic analyzer transitions to the STAT mode in which the emergency rack is moved to the emergency sample lid 104 and the user opens the emergency sample lid 104 and erects an additional sample on the emergency rack, whereupon the automatic analyzer can start analyzing the additional sample.

The timing to transition to the STAT mode after having received the input from the STAT button will be described below with reference to FIG. 3. According to the present embodiment, a hybrid system including a biochemical automatic analyzer and an immunological automatic analyzer will be described below. First, the automatic analyzer prepares itself for an analysis on items that the user has requested the automatic analyzer to analyze. The automatic analyzer starts analyzing samples in a biochemical group (type A) and an immunological group (type B). The automatic analyzer has received the input, from the user via the STAT button, with the analysis situation having analysis completion request items 301 (requests 2, 6, 7, and 8), request items during analysis 302 (requests 3 and 8), and unanalyzed request items 303 (requests 4, 9, 10, 11, and 12).

If requested sample containers 103 have already been erected on the sample racks 102 stored on the sample container placement mechanism 101, then the sample container placement mechanism 101 is normally in an analyzing operation. The timing to transition from the analyzing operation to the STAT mode is different depending on whether the sample stored in a erected sample container 103 is an ordinary patient sample (hereinafter referred to as "ordinary sample"), an emergency sample (hereinafter referred to as "STAT sample") that demands urgent handling, and a standard fluid (hereinafter referred to as "calibrator").

In a case of an ordinary sample, if dispensing for a request item having the sample has started or analyzing for a request item having the sample has been planned, then the automatic analyzer completes the dispensing for the request item. If dispensing for a request item has not been planned, then the automatic analyzer does not start the dispensing for the request item. This holds true if dispensing for the other request items with the sample have started.

In a case of a STAT sample, the automatic analyzer completes the dispensing of all request items that have not yet been done, before the automatic analyzer enters the STAT mode. In a case of a calibrator, the automatic analyzer similarly completes the dispensing of all calibration request items that have not yet been done, before the automatic analyzer enters the STAT mode. As illustrated in FIG. 6, the automatic analyzer displays the period of time required until it enters the STAT mode for the user to recognize the time when the user can charge a STAT sample. Thus, the user can recognize the latency time and can perform another task during that latency time.

Since the samples erected initially are only ordinary samples according to the embodiment illustrated in FIG. 3, when the automatic analyzer has received a request from the STAT button, the request items during analysis 302 (requests 3 and 8) are being analyzed, and the automatic analyzer does not transition to the STAT mode and continues the analysis. In other words, the automatic analyzer is in a state of reserving a transition to the STAT mode and does not interrupt the analysis. In addition, as dispensing for the unanalyzed request items 303 (requests 4, 9, 10, 11, and 12) has not started, the automatic analyzer transitions to the STAT mode at the time the request items during analysis 302 (requests 3 and 8) are completed.

After the transition to the STAT mode, the emergency rack is moved to the emergency sample lid 104, and the user opens the emergency sample lid 104 and erects a STAT sample on the emergency rack. As the user has requested an emergency sample request item 304 with respect to the STAT sample, the automatic analyzer starts analyzing the STAT sample preferentially to analysis items requested with ordinary samples.

After the analysis of the emergency sample request item 304 with respect to the STAT sample has been completed, the automatic analyzer continuously carries out an analysis of the unanalyzed request items 303 (requests 4, 9, 10, 11, and 12) requested with ordinary samples.

FIG. 4 illustrates a screen example for setting an emergency rack. A screen example 401, that is displayed on the display unit of the control unit 7 displays that a rack installed on the sample disk is an ordinary sample rack 402 or an emergency rack 403. The user sets a desired rack ID in an emergency rack ID setting field 404, and presses a registration button, changing the setting of the rack from an ordinary sample rack to an emergency rack. Emergency rack ID information may be set from an external system (e.g., a clinical examination information system).

FIG. 5 is a flowchart from after the STAT button has been pressed until a request for a STAT sample is added. Step (hereinafter referred to as "S") 501 represents a STAT button input. In response to an instruction input from the STAT button in S501, the automatic analyzer confirms whether there is a sample being analyzed or not (S502). If there is a sample being analyzed (YES), then the automatic analyzer confirms identification information on the sample (S503).

If the identification information represents "calibrator," then the automatic analyzer completes the dispensing of calibrators and reagents in order to respond to all calibration requests that have not yet been done (S504). If the identification information represents STAT samples, then the automatic analyzer completes the dispensing of samples and reagents in order to respond to all the "STAT samples" that have not yet been done (S505). If the identification information represents "ordinary samples" and "QC samples,"

then the automatic analyzer completes the dispensing of samples and reagents being analyzed (S506). Then, the automatic analyzer displays the period of time required until the dispensing is completed (the period of time required until the automatic analyzer transitions to the STAT mode) (S507). When the period of time required until the dispensing is completed has expired, the automatic analyzer transitions to the STAT mode.

Then, the automatic analyzer starts moving the emergency rack (S508). If there is no sample being analyzed (NO) at the time of confirming a sample being analyzed (S502), then the automatic analyzer immediately transitions to the STAT mode and starts moving the emergency rack (S508). The automatic analyzer acquires the current position of the emergency rack set in FIG. 4 (S509) and moves the emergency rack from the current position to an emergency sample inlet (S510). In FIG. 2, the sample container placement mechanism 101 is moved with the emergency rack and the reagent bottles integrally combined with each other. However, the storage units for the sample containers and the reagent containers may be separate from each other, and only the emergency rack (on the outer circumference) may be moved (see FIGS. 7A and 7B). The emergency sample inlet may be provided not only in the illustrated position, but also in any position established by the user.

The automatic analyzer confirms whether the user has completed the installation of STAT samples (S511). If the completion of the installation is "No," then automatic analyzer confirms again whether the user has completed the installation of STAT samples (S511). If the completion of the installation is "Yes," then the automatic analyzer completes the STAT mode and performs a barcode scan for reading barcode information on samples installed on the emergency rack (S512). After having performed the barcode scan, the automatic analyzer confirms the results of the scan (S513). If the results of the scan are "OK," then the user adds a request with respect to the read sample information (S514), and the barcode scan is finished. If the results of the scan are "NG," then the user does not add a request with respect to the read sample information (S514), and the barcode scan is finished. Upon the barcode scan, the automatic analyzer can receive measured information from an external system (e.g., a clinical examination information system). After the barcode scan has been finished, the automatic analyzer continues analyzing samples. Although it has been described above that if the completion of the installation is "Yes," then the automatic analyzer completes the STAT mode, the automatic analyzer may complete the STAT mode when the user presses the STAT button again.

FIG. 6 illustrates a screen example for setting an emergency rack. A screen example 601 that is displayed on the display unit of the control unit 7 displays sample rack information on the sample disk being analyzed. The information displays the ordinary sample rack 402 and the emergency rack 403, set in the screen example 401, respectively as 602 and 603. The screen example also indicates a period of time 604 required until the automatic analyzer enters the STAT mode.

According to the present invention as described in detail above, regarding the automatic analyzer including the disk-type container placement mechanism, a technology can be provided that: enables, without installing a dedicated inlet, the work such as additional installation of a container performed by an operator during an analyzing operation; realizes better convenience and easiness of the work without taking much trouble of the operator; contributes to a cost reduction; and increases customer satisfaction.

The present invention is not limited to the above embodiment, but covers various modifications. For example, the above embodiment has been described in detail for a better understanding of the present invention and is not limited to anything that includes all the constituent elements described above.

REFERENCE SIGNS LIST

1: incubator
2: reaction vessel
3: reagent bottle
4: dispensing mechanism
5: cleaning tank
6: spectrophotometer
7: control unit
101: sample container placement mechanism
102: sample rack
103: sample container
104: emergency sample lid
301: analysis completion request item
302: request item during analysis
303: unanalyzed request item
304: emergency sample request item
401: emergency rack setting screen
402: ordinary sample rack
403: emergency rack
404: emergency rack ID setting field
405: registration button
601: sample overview screen
602: ordinary sample rack
603: emergency rack
604: STAT mode transition time

The invention claimed is:

1. An automatic analyzer comprising:
a storage unit previously stored with a sample container holding a sample, before measurement of the sample;
a sample dispensing unit configured to aspirate and dispense the sample from the sample container;
an input unit configured to receive a command to store an emergency sample in the storage unit;
a control unit configured to confirm whether the sample held in the sample container stored in the storage unit is an ordinary sample or not, and that, when confirming that the sample is an ordinary sample, configured to control such that, after a first operation being performed by the sample dispensing unit at a point of time when the input unit is configured to receive the command is completed, a second operation scheduled configured to be performed next by the sample dispensing unit is not started; and
a display unit configured to prompts a user to store the emergency sample in the storage unit.

2. The automatic analyzer according to claim 1, wherein the storage unit has a disk shape, and the sample is disposed on an outer peripheral portion of the storage unit and a reagent is disposed on an inner peripheral portion of the storage unit.

3. The automatic analyzer according to claim 2, wherein the control unit controls so as to move the outer peripheral portion.

4. An automatic analyzer comprising:
a storage unit previously stored with a sample container holding a sample, before measurement of the sample;
a sample dispensing unit configured to aspirate and dispense the sample from the sample container;

an input unit configured to receive a command to store an emergency sample in the storage unit; and a control unit configured to confirm whether the sample held in the sample container stored in the storage unit is an ordinary sample or not, and that, when confirming that the sample is an ordinary sample, configured to control such that, after a first operation being performed by the sample dispensing unit at a point of time when the input unit is configured to receive the command is completed, a second operation scheduled configured to be performed next by the sample dispensing unit is not started, wherein the storage unit includes a first storage unit configured to store an ordinary sample and a second storage unit configured to store the emergency sample, and after controlling such that the second operation is not started, the control unit is configured to control the second storage unit to move to a position where the emergency sample is inserted by a user.

5. The automatic analyzer according to claim 4, wherein the storage unit has a disk shape, and the sample is disposed on an outer peripheral portion of the storage unit and a reagent is disposed on an inner peripheral portion of the storage unit.

6. The automatic analyzer according to claim 5, wherein the control unit controls so as to move the outer peripheral portion.

7. The automatic analyzer according to claim 1, wherein the control unit confirms whether the sample held in the sample container stored in the storage unit is an emergency sample or not, and that, when confirming that the sample is an emergency sample, completes all operations including the first operation that has been performed on the emergency sample by the sample dispensing unit at the point of time when the input unit receives the command and the second operation scheduled to be performed on the emergency sample, and the display unit displays for the user a period of time required until another emergency sample different from the emergency sample held in the sample container stored in the storage unit can be additionally stored in the storage unit.

8. The automatic analyzer according to claim 1, wherein the control unit confirms whether the sample held in the sample container stored in the storage unit is a standard fluid or not, and that, when confirming that the sample is a standard fluid, completes all operations including the first operation that has been performed on the standard fluid by the sample dispensing unit at the point of time when the input unit receives the command and the second operation scheduled to be performed on the standard fluid, and the display unit displays for the user a period of time required until the emergency sample can be additionally stored in the storage unit.

9. The automatic analyzer according to claim 4, wherein the control unit confirms whether the sample held in the sample container stored in the storage unit is an emergency sample or not, and that, when confirming that the sample is an emergency sample, completes all operations including the first operation that has been performed on the emergency sample by the sample dispensing unit at the point of time when the input unit receives the command and the second operation scheduled to be performed on the emergency sample, and after all the operations have been completed, the control unit controls the second storage unit to move to the position where the emergency sample is inserted by the user.

10. The automatic analyzer according to claim 4, wherein the control unit confirms whether the sample held in the sample container stored in the storage unit is a standard fluid or not, and that, when confirming that the sample is a standard fluid, completes all operations including the first operation that has been performed on the standard fluid by the sample dispensing unit at the point of time when the input unit receives the command and the second operation scheduled to be performed on the standard fluid, and after all the operations have been completed, the control unit controls the second storage unit to move to the position where the emergency sample is inserted by the user.

* * * * *